Jan. 27, 1942. K. C. BUGG 2,270,929
TOOL
Filed Nov. 18, 1939
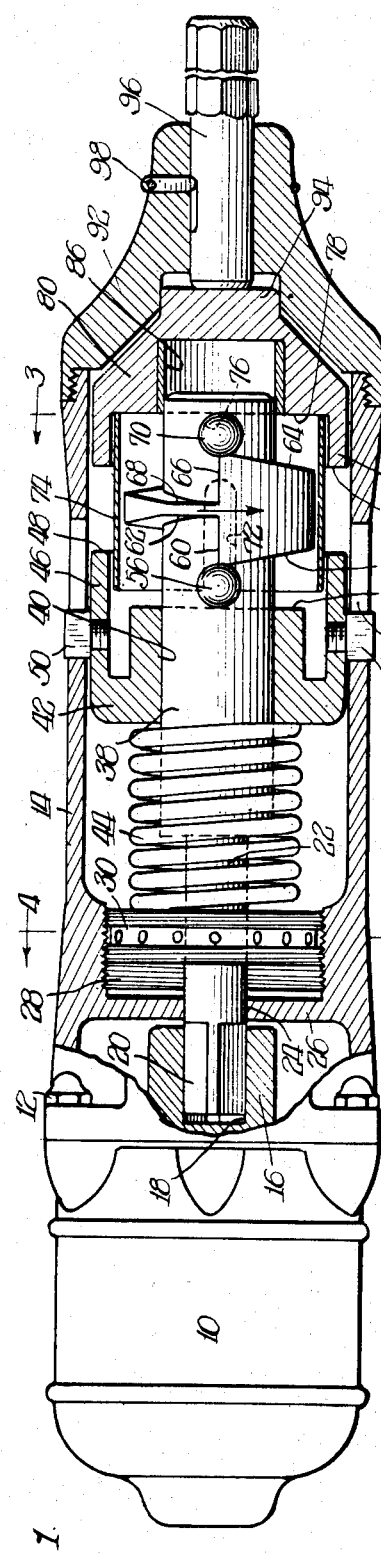
INVENTOR.
Kenly C. Bugg,
BY
ATTORNEYS Patented Jan. 27, 1942

2,270,929

UNITED STATES PATENT OFFICE 2,270,929

TOOL

Kenly C. Bugg, Fort Wayne, Ind.

Application November 18, 1939, Serial No. 305,205

18 Claims. (Cl. 125—33)

This invention pertains to a power tool, and more particularly to a power driven chipping tool or hammer.

It is an object of this invention to provide a power driven chipping tool where there is a continuous flow of actuating energy.

Another object is to provide a chipping tool which is adapted to be made in very small sizes whereby it may be used in dentistry or as an engraving tool, or may be readily used in various larger sizes for masonry, caulking, closing the space between steel plates, wrecking, and other jobs.

Still another object is to provide a power driven tool where there is a substantially constant delivery of force and wherein rotary power means drives the device to deliver a reciprocating movement.

Yet another object is to provide a power tool wherein the blows to the operating tool are only had in the delivery direction, thus reducing the shock to the operator, and permitting the use of a lighter tool as heavy recoil mechanism is eliminated.

A further object is to provide a power tool which is operated by rotating power means but wherein means is provided for converting this rotary motion into one of reciprocation, but this last named means being so constructed and arranged that a relatively small unit may be made, as no impact is transmitted to this last named means.

Yet a further object is to provide a mechanical motion for transmitting rotary motion into reciprocating motion in a simple, efficient and inexpensive manner, yet one which gives a tremendous mechanical advantage.

Still a further object is to provide a mechanical motion wherein cams and balls are used to obtain a predetermined relative movement between members, but wherein the balls travel in a similar or predetermined manner over the respective engaged cams.

Another object is to provide a power driven tool having a reciprocating member, said member being urged in one direction by resilient means, the member being moved to load the resilient member by a pair of rotatable members disposed on opposite sides of a rotatable double cam so that the rotatable members function as a thrust bearing and loading means while the resilient means is being compressed or loaded. Thus a construction is provided where the resilient means is not rotated and the thrust bearing is operative only during the compression or loading cycle. This prevents friction and heating which would occur if the resilient means were rotated and no thrust bearings as such provided therefor. If only one cam face were provided, thrust bearings would have to be provided for the resilient means, but these thrust bearings would not add to the lift, i. e., there would be only half the loading value of the structure herein provided.

With these and various other objects in view, the invention may consist of certain novel features of construction and operation, as will be more fully described and particularly pointed out in the specification, drawing and claims appended hereto.

In the drawing, which illustrates an embodiment of the device and wherein like reference characters are used to designate like parts—

Figure 1 is an elevation partly in section of a device embodying the invention, showing the same in loaded position;

Figure 2 is an elevation partly in section of the device illustrated in Figure 1, showing the same in unloaded position;

Figure 3 is a transverse sectional elevation taken substantially in the plane as indicated by the line 3—3 of Figure 1;

Figure 4 is a transverse sectional elevation taken substantially in the plane as indicated by the line 4—4 of Figure 1; and Figure 5 is an elevation of the retaining cage for the balls.

In the form of the device illustrated, the source of power 10 is shown as a motor, said motor being adapted to be provided with actuating means such as a switch or valve (not shown), depending upon whether an electrical motor or a fluid motor is used, said motor being actuated from a suitable source of energy and rotating in the direction of the arrows shown in Figures 1 and 2. The motor is secured as at 12 to the casing 14 of the device, the rotary motor shaft 16 being provided with the recess 18 for slidably but non-rotatably receiving the splined end 20 of the rotatable and reciprocating shaft 22. The shaft 22 passes through a suitable aperture 24 provided in the wall 26 of the casing, said casing being threaded as at 28 for receiving the adjustable spring seat 30. The spring seat 30 is provided with the centrally disposed aperture 32 through which the shaft 22 passes, and the seat 30 is provided with suitable means such as the spaced radial sockets 34 for adjusting the position of the seat, the casing 14 being interrupted as at 36 for permitting a suitable tool to be inserted into said radial sockets 34.

The shaft 22 is provided with the enlarged bearing portion 38 passing through the centrally disposed aperture 40 provided in the hammer 42. A source of energy is provided for moving the hammer in one direction, shown toward the right in Figures 1 and 2, the source of energy in the embodiment shown being the coil spring 44 seated at one end on the seat member 30 and at the other end on the hammer; it being appreciated, of course, that other power means such as fluid may be employed. The hammer is provided with the circular skirt or flange 46 having the striking surface 48 thereon, said skirt being provided with outwardly extending positioning means 50 slidably received in the slots 52 in the casing 14 for preventing rotation of the hammer.

The hammer is also provided with the centrally disposed cylindrical projection having the end surface or track 54 adapted to be engaged by the ball 56 for controlling movement of the hammer. The ball 56 is adapted to be moved by the substantially spiral track 58 provided on the enlarged portion 38 of the shaft, the spiral track terminating in the axial surface or precipice 60 permitting the ball to drop or to be moved to the starting surface 62 leading to the start of the helical track. An oppositely disposed similar helical track 64 is provided on the enlarged portion 38 of the shaft, likewise provided with the axial surface 66 in alignment with the surface 60 and a starting surface 68 parallel to and of the same length as the starting surface 62. The track 64 is adapted to be engaged by the ball 70, of the same size as ball 56.

The ball 56 is adapted to have a reciprocating movement in the axially disposed slot 72 provided in the sleeve or cage 74, and the ball 70 is adapted to be received in the circular aperture 76 provided in the sleeve and in alignment with the slot 72. The sleeve 74 is received in the cup 78 of the anvil 80 and in the circular recess between the cylindrical portion of the hammer and the adjacent skirt 46, the anvil being provided with the upstanding flange or skirt 82 provided with the striking surface 84 adapted to receive the blow from the surface 48 of the hammer 42. The end of the portion 38 of the shaft is suitably journaled as at 86 in the anvil, and the anvil is provided with the sloping or frusto-conical surface 88 adapted to project into and be received by a complementary surface 90 of the end casting 92 of the tool. The anvil is provided with the end cylindrical surface 94 adapted to abut against the end of a tool 96 which extends through the end casting and is suitably retained by the retainer 98. The tool is of any desired form, such as a caulking tool, hammer, chipping tool, or the like.

In the operation of a tool of this character, assuming the balls to be in the position illustrated in Figure 2, the operator presses the tool 96 against the object to be operated upon, causing a slight inward movement of the anvil 80 from the end casting 92, such as shown in Figure 1. The motor 10, which has been energized or may then be started, causes rotation of the shaft 22, which will cause the balls 56 and 70 to have an effective movement along the helical tracks 58 and 64, respectively. Inasmuch as the ball 70 is held relatively stationary by the aperture 76, and the ball 56 is free to move in the slot 72, the shaft 22 will be given a longitudinal movement toward the motor, moving the hammer 42 toward the motor, compressing the spring 44 as the cage will be held against the anvil. The balls will reach the surfaces 60 and 66 at the same time, and will have a simultaneous effective dropping movement, permitting the shaft 22 to move toward the tool 96. The striking surface 48 of the hammer will be moved to impart a striking blow to striking surface 84 of the tool 96, but it will be seen that no blow is taken by the balls, as the distance the surface 48 moves to strike the surface 84 is less than the distance the balls drive from the highest points of the tracks to the lowest or starting positions.

With a device of this character an immense mechanical advantage is attained, yet at the same time the operator will not be subjected to great shocks. In tools using reciprocating hammers the operator is subjected to intense shocks due to the fact that the hammer must be arrested in its backward movement in order to be propelled forward to give the striking blow. Recoil mechanism therefore must be provided in an attempt to absorb these shocks, which is heavy and expensive, but in the present device this, of course, is not necessary. Also, with a device of this character large variations in size can be had. For example, the tool can be made very small, being in the nature of a dentist's tool, or an engraver's tool. It can also be increased in size where it is used in masonry work, caulking, digging or the like. It need not be made extremely heavy because of the mechanical advantage which is attained by this mechanism, and because the motor can be driven at high speeds to transmit many more blows than can be attained with a reciprocating hammer.

Further, it will be appreciated that by the mechanical motion provided to transmit rotary motion to reciprocating motion, other devices may be made which will enjoy the simple, inexpensive, yet effective method of transmitting one form of motion to another through this mechanism.

It is to be understood that I do not wish to be limited by the exact embodiment of the device shown, which is merely by way of illustration and not limitation, as various and other forms of the device will, of course, be apparent to those skilled in the art without departing from the spirit of the invention or the scope of the claims.

What is claimed is:

1. In a device of the character described, the combination of a casing, a tool axially mounted for limited reciprocation at one end of said casing, a motor mounted at the opposite end of said casing, an axial shaft disposed in said casing and adapted to be rotated by said motor, an anvil abutting said tool and having a journal for said shaft, a reciprocating hammer for imparting a blow to said anvil, guiding means between said hammer and casing for preventing rotation of said hammer, a pair of oppositely disposed substantially spiral tracks disposed on said shaft to move therewith, said tracks terminating in aligned, axially disposed track portions returning to the lowest starting surfaces of the respective tracks, a pair of balls, one of said balls being disposed to engage one of said tracks and the other ball being disposed to engage the other of said tracks, a cage for said balls adapted to engage said anvil, said cage being provided with an aperture for receiving one of said balls to prevent movement thereof axially of said device, said cage being provided with a slot for the other of said balls for permitting said axial movement of said other ball to thereby move said hammer away from said anvil until said balls reach said axial portions and return to the starting surfaces, a spring seat disposed in said casing, and a spring disposed between said spring seat and said hammer adapted to be compressed by movement of said balls from said starting surfaces and to move said hammer to strike said anvil when said balls return to said starting surfaces, the striking surfaces of said anvil and hammer being disposed so that said balls are not subjected to any blow.

2. In a device of the character described, the combination of a casing, a tool axially mounted for limited reciprocation at one end of said casing, a motor mounted at the opposite end of said casing, an axial shaft disposed in said casing and adapted to be rotated by said motor, a connection between said motor and shaft permitting reciprocation of said shaft, an anvil abutting said tool and having a journal for said shaft, a reciprocating hammer for imparting a blow to said anvil, a pair of oppositely disposed substantially spiral tracks disposed on said shaft to move therewith, said tracks terminating in aligned, axially disposed track portions returning to the lowest starting surfaces of the respective tracks, a pair of balls, one of said balls being disposed to engage one of said tracks and the other ball being disposed to engage the other of said tracks, a cage for said balls adapted to engage said anvil, said cage being provided with an aperture for receiving one of said balls to prevent movement thereof axially of said device, said cage being provided with a slot for the other of said balls for permitting said axial movement of said other ball to thereby move said hammer away from said anvil until said balls reach said axial portions and return to the starting surfaces, a spring seat disposed in said casing, a spring disposed between said spring seat and said hammer adapter to be compressed by movement of said balls from said starting surfaces and to move said hammer to strike said anvil when said balls return to said starting surfaces, said tracks being so arranged that said balls are not operative to start relative movement between said hammer and anvil until after a predetermined rotation of said shaft.

3. In a device of the character described, the combination of a casing, a tool axially mounted for limited reciprocation at one end of said casing, a motor mounted at the opposite end of said casing, an axial shaft disposed in said casing and adapted to be rotated by said motor, an anvil and hammer adapted to be relatively moved to impart a blow to said tool, a pair of oppositely disposed substantially spiral tracks disposed on said shaft to move therewith, said tracks terminating in aligned, axially disposed track portions returning to the lowest starting surfaces of the respective tracks, a pair of balls, one of said balls being disposed to engage one of said tracks and the other ball being disposed to engage the other of said tracks, a cage for said balls, said cage being provided with an aperture for receiving one of said balls to prevent movement thereof axially of said device, said cage being provided with a slot for the other of said balls for permitting said axial movement of said other ball to thereby cause relative separating movement between said hammer and anvil until said balls reach said axial portions and return to the starting surfaces, a spring in said housing to cause said anvil and hammer to be moved into impact engagement when said balls return to said starting surfaces, said spring being compressed when said balls move along said tracks from said starting position.

4. In combination, a rotating and reciprocating shaft, relatively movable and stationary members, a pair of oppositely disposed substantially helical tracks non-rotatably provided on said shaft, said tracks having lower starting portions, the highest portions of said tracks being respectively connected to the lowest portions thereof by axially disposed track portions, a cage provided between said movable and stationary members and having a slot and an aperture therein disposed in axial alignment, a ball disposed in said slot and a ball disposed in said aperture, one of said balls being adapted to engage one of said tracks and the other of said balls being adapted to engage the other of said tracks, rotative movement of said shaft causing said balls to ride up said tracks to separate said movable and stationary members to give a motion of translation to said shaft, and means for moving said movable and stationary members toward each other when said balls move over said axial track portions to said starting position.

5. In a device of the character described, the combination of a casing, a tool axially mounted for limited reciprocation at one end of said casing, a motor mounted at the opposite end of said casing, an axial shaft disposed in said casing and adapted to be rotated by said motor, an anvil and hammer adapted to be relatively moved to impart a blow to said tool, a pair of oppositely disposed substantially spiral tracks disposed on said shaft to move therewith, said tracks terminating in aligned, axially disposed track portions returning to the lowest starting surfaces of the respective tracks, a pair of balls, one of said balls being disposed to engage one of said tracks and the other ball being disposed to engage the other of said tracks, a cage for said balls, said cage being provided with an aperture for receiving one of said balls to prevent movement thereof axially of said device, said cage being provided with a slot for the other of said balls for permitting said axial movement of said other ball to thereby cause relative separating movement between said hammer and anvil until said balls reach said axial portions and return to the starting surfaces, a spring in said housing to cause said anvil and hammer to be moved into impact engagement when said balls return to said starting surfaces, said spring being compressed when said balls move along said tracks from said starting position, the striking surfaces of said anvil and hammer being disposed so that said balls are not subjected to any blow.

6. In a device of the character described, the combination of a casing, a tool axially mounted for limited reciprocation at one end of said casing, a motor mounted at the opposite end of said casing, an axial shaft disposed in said casing and adapted to be rotated by said motor, an anvil and hammer adapted to be relatively moved to impart a blow to said tool, a pair of oppositely disposed substantially spiral tracks disposed on said shaft to move therewith, said tracks terminating in aligned, axially disposed track portions returning to the lowest starting surfaces of the respective tracks, a pair of balls, one of said balls being disposed to engage one of said tracks and the other ball being disposed to engage the other of said tracks, a cage for said balls, said cage being provided with an aperture for receiving one of said balls to prevent movement thereof axially of said device, said cage being provided with a slot for the other of said balls for permitting said axial movement of said other ball to thereby cause relative separating movement between said hammer and anvil until said balls reach said axial portions and return to the starting surfaces, a spring in said housing to cause said anvil and hammer to be moved into impact engagement when said balls return to said starting surfaces, said spring being compressed when said balls move along said tracks from said starting position, said tracks being so arranged that said balls are not operative to start relative movements between said hammer and anvil until after a predetermined rotation of said shaft.

7. In a device of the character described, the combination of a casing, a tool axially mounted for limited reciprocation at one end of said casing, a motor mounted at the opposite end of said casing, an axial shaft disposed in said casing and adapted to be rotated by said motor, an anvil abutting said tool and having a journal for said shaft, a reciprocating hammer for imparting a blow to said anvil, a substantially spiral track disposed on said shaft to move therewith, said spiral track having an initial point and a termination point and a return track portion connecting said points, a ball movable over said track to cause movement of said hammer away from said anvil when said ball is moving from said initial point to said termination point, and means for propelling said hammer into engagement with said anvil when said ball is moving along said return track portion, said return track portion being of greater depth than the diameter of said ball.

8. In combination, a rotating and reciprocating shaft, means for rotating said shaft, means for reciprocating said shaft, said last named means including a pair of oppositely disposed cams having starting points and termination points, said points being connected respectively by axial surfaces, balls movable over said cams and said surfaces, and means for causing one of said balls to move relatively to the other of said balls in a predetermined manner.

9. In combination, a rotating and reciprocating shaft, means for rotating said shaft, means for reciprocating said shaft, said last named means including a pair of oppositely disposed cams having starting points and termination points, said points being connected respectively by axial surfaces, balls movable over said cams and said surfaces, and means for causing one of said balls to move relatively to the other of said balls in a predetermined manner, said last named means including means for maintaining one of said balls in a predetermined position and permitting movement of the other of said balls with respect to the first named ball in a direction axially of the shaft.

10. In a percussion tool, the combination of a casing, a shaft mounted in said casing for rotary and translatory movements with respect thereto, means for rotating said shaft, cam means rotatable by said shaft, said cam means including a pair of cams facing oppositely in a direction axially of said shaft, said cams having starting portions aligned axially of said shaft, helical portions extending from said starting portions, one being right-handed and the other being left-handed, each of said helical portions and each of said starting portions being connected by a precipice aligned with the other precipice, balls movable over said cam means when said shaft revolves, means for maintaining said balls in alignment so that they fall down the respective precipices simultaneously, said precipices being of greater depth than the diameter of said balls, and means for moving said shaft to initial position when said balls fall down said precipices.

11. In a percussion tool, the combination of a casing, a shaft mounted in said casing for rotary and translatory movements with respect thereto, means for rotating said shaft, cam means rotatable by said shaft, said cam means including a pair of cams facing oppositely in a direction axially of said shaft, said cams having starting portions aligned axially of said shaft, helical portions extending from said starting portions, one being right-handed and the other being left-handed, each of said helical portions and each of said starting portions being connected by a precipice aligned with the other precipice, balls movable over said cam means when said shaft revolves, means for maintaining said balls in alignment so that they fall down the respective precipices simultaneously, said last named means including a sleeve having axially aligned cut out portions for receiving said balls, one of said cut out portions being elongated, said precipices being of greater depth than the diameter of said balls, and means for moving said shaft to initial position when said balls fall down said precipices.

12. In a percussion tool, the combination of a casing, a shaft mounted in said casing for rotary and translatory movements with respect thereto, means for rotating said shaft, cam means rotatable by said shaft, said cam means including a pair of cams facing oppositely in a direction axially of said shaft, said cams having starting portions aligned axially of said shaft, helical portions extending from said starting portions, one being right-handed and the other being left-handed, each of said helical portions and each of said starting portions being connected by a precipice aligned with the other precipice, balls movable over said cam means when said shaft revolves, means for maintaining said balls in alignment so that they fall down the respective precipices simultaneously, said precipices being of greater depth than the diameter of said balls, means for moving said shaft to initial position when said balls fall down said precipices, and a hammer movable axially of said shaft by said balls and said last named means.

13. In a percussion tool, the combination of a casing, a shaft mounted in said casing for rotary and translatory movements with respect thereto, means for rotating said shaft, cam means rotatable by said shaft, said cam means including a pair of cams facing oppositely in a direction axially of said shaft, said cams having starting portions aligned axially of said shaft, helical portions extending from said starting portions, one being right-handed and the other being left-handed, each of said helical portions and each of said starting portions being connected by a precipice aligned with the other precipice, balls movable over said cam means when said shaft revolves, means for maintaining said balls in alignment so that they fall down the respective precipices simultaneously, said last named means including a sleeve having axially aligned cut out portions for receiving said balls, one of said cut out portions being elongated, said precipices being of greater depth than the diameter of said balls, means for moving said shaft to initial position when said balls fall down said precipices, and a hammer movable axially of said shaft by said balls and said last named means.

14. In a percussion tool, the combination of a casing, a rotatable shaft disposed in said casing, cam means rotatable by said shaft, said cam means being provided with a plurality of precipices extending substantially in the direction of the axis of the shaft, floating rotatable members adapted to move over said cam means and fall down said precipices, means for causing said rotatable members to fall down said precipices at substantially the same time, a reciprocatory member adapted to be reciprocated in accordance with the movement of said rotatable members over said cam means and down said precipices, and resilient means urging said reciprocatory member toward said rotatable members.

15. In a precussion tool, the combination of a casing, a rotatable shaft disposed in said casing, oppositely disposed cam means rotatable by said shaft, said cam means being provided with a plurality of precipices extending substantially in the direction of the axis of the shaft, floating rotatable members for said cam means adapted to move over said cam means and fall down said precipices, means for causing said rotatable members to fall down said precipices at substantially the same time, a reciprocatory member adapted to be reciprocated in accordance with the movement of said rotatable members over said cam means and down said precipices, and resilient means urging said reciprocatory member toward said rotatable members.

16. In a percussion tool, the combination of a casing, a rotatable shaft disposed in said casing, oppositely disposed cam means rotatable by said shaft, said cam means being provided with a plurality of precipices extending substantially in the direction of the axis of the shaft, floating rotatable members for said cam means adapted to move over said cam means and fall down said precipices, means for maintaining the rotatable members in a predetermined relation circumferentially of said shaft to cause said rotatable members to fall down said precipices at substantially the same time, a reciprocatory member adapted to be reciprocated in accordance with the movement of said rotatable members over said cam means and down said precipices, and resilient means urging said reciprocatory member toward said rotatable members.

17. In a percussion tool, the combination of a casing, a rotatable shaft disposed in said casing, oppositely disposed cam means rotatable by said shaft, said cam means being provided with a plurality of precipices extending substantially in the direction of the axis of the shaft, floating rotatable members for said cam means adapted to move over said cam means and fall down said precipices, means for maintaining said rotatable members in a predetermined relation circumferentially of said shaft to cause said rotatable members to have substantially the same movement over said cams at the same time, a reciprocatory member adapted to be reciprocated in accordance with the movement of said rotatable members over said cam means and down said precipices, and resilient means urging said reciprocatory member toward said rotatable members.

18. In a percussion tool, the combination of a casing, a rotatable shaft disposed in said casing, cam means rotatable by said shaft, said cam means including cam rises extending in opposite directions in a direction axially of said shaft, whereby oppositely disposed cam rises are provided, said cam rises each having a starting portion and a termination portion and a connecting portion conecting said termination and starting portions, said connecting portions being disposed in substantially an axial direction, rotatable members movable respectively over said cam rises from said starting portions to said termination portions, and over said connecting portions to said starting portions, respectively, means for controlling the movement of said rotatable members over said cam rises to cause said rotatable members to move substantially simultaneously from said termination portions to said starting portions, a blow delivering reciprocable member moved by said rotatable members, and resilient means urging said reciprocable member toward said rotatable members, said rotatable members being so constructed and arranged with said cam rises that they act as a thrust bearing when said rotatable members move over said cam rises to move said reciprocable member toward said resilient means, said reciprocable member being conditioned to deliver a blow when said rotatable members reach the respective termination portions prior to moving to said starting portions from said termination portions.

KENLY C. BUGG.